United States Patent [19]

Eckerle

[11] Patent Number: 4,743,838
[45] Date of Patent: May 10, 1988

[54] CAPACITANCE DISPLACEMENT MEASURING INSTRUMENT HAVING WAVE SHAPED SUBELECTRODES AND MULTIPLEXER

[75] Inventor: Joseph S. Eckerle, Redwood City, Calif.

[73] Assignee: Mitutoyo Mfg. Co., Ltd., Tokyo, Japan

[21] Appl. No.: 665,534

[22] Filed: Oct. 26, 1984

[30] Foreign Application Priority Data

Oct. 27, 1983 [JP] Japan .................. 58-201673

[51] Int. Cl.⁴ .................. G01R 27/26; G08C 19/10
[52] U.S. Cl. .................. 324/61 R; 324/61 P; 340/870.37
[58] Field of Search .................. 324/61 R, 61 P; 340/870.37

[56] References Cited

U.S. PATENT DOCUMENTS

| | | | |
|---|---|---|---|
| 3,068,457 | 12/1962 | Nevius | 340/870.37 |
| 3,125,716 | 3/1964 | Machlis | 340/870.37 |
| 3,219,920 | 11/1965 | Wall | 340/870.37 X |
| 3,938,113 | 2/1976 | Dobson et al. | 340/870.37 |
| 4,092,579 | 5/1978 | Weit | 324/61 R X |
| 4,238,781 | 12/1980 | Vercellotti et al. | 324/61 R X |
| 4,242,666 | 12/1980 | Reschovsky et al. | 340/870.37 X |
| 4,420,754 | 12/1983 | Andermo | 340/870.37 |
| 4,429,307 | 1/1984 | Fortescue | 340/870.37 |
| 4,437,055 | 3/1984 | Meyer | 324/61 P X |
| 4,459,702 | 7/1984 | Medwin | 324/61 R X |
| 4,654,581 | 3/1987 | Neukermans et al. | 324/61 R |

Primary Examiner—Reinhard J. Eisenzopf
Assistant Examiner—Jack B. Harvey
Attorney, Agent, or Firm—Parkhurst & Oliff

[57] ABSTRACT

In a capacitance type displacement measuring instrument, wherein a change in electric capacitance between electrodes due to a relative displacement between two members movable relative to each other is detected on the basis of a change in phase of a detection signal, and a relative displacement between the two members is measured from the change in phase, square waveform signals are applied in inversed phase to two transmitting electrodes provided on one of the members and signals induced on two wave pattern electrodes provided on the other of the members are received by receiving electrodes provided on the first of the members. Outputs from the receiving electrodes are successively taken in by a multiplexer, and then the amplitude-modulated square wave signals, outputted from the multiplexer, are demodulated. A phase detector measures the phase of the demodulated waveform, thereby measuring the relative displacement on the basis of change in phase.

14 Claims, 7 Drawing Sheets

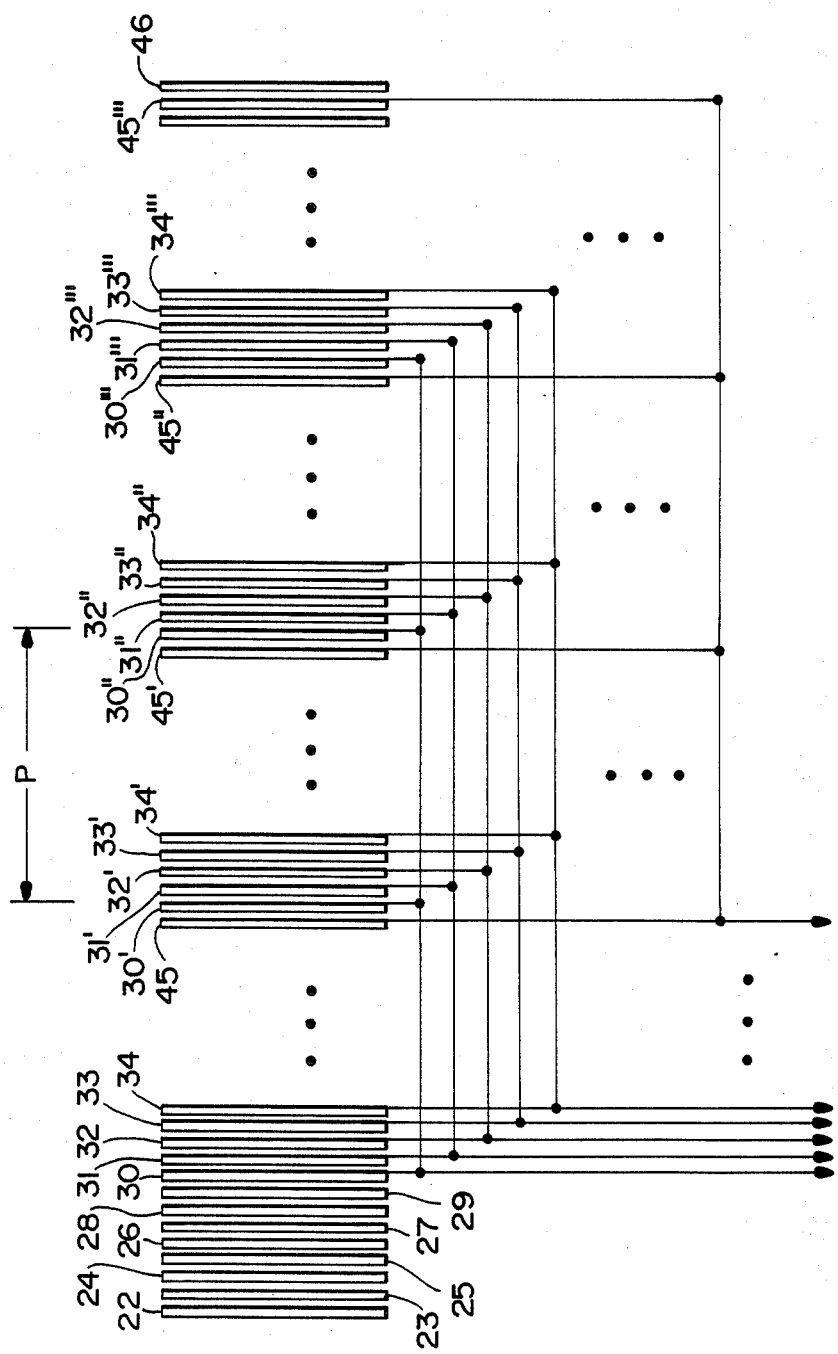

CAPACITANCE DISPLACEMENT MEASURING INSTRUMENT HAVING WAVE SHAPED SUBELECTRODES AND MULTIPLEXER

BACKGROUND OF THE INVENTION

1. Field of the Invention

This invention relates to capacitance type displacement measuring instruments, and more particularly to improvements in a capacitance type displacement measuring instrument wherein a charge in electric capacitance between electrodes due to a relative displacement between two members movable relative to each other results in a change in phase of a detection signal, and the relative displacement between the two members is determined from the change in phase.

2. Description of the Prior Art

Measuring instruments for measuring a length or the like of an article, wherein the movement of articles movable relative to each other, such as the movement of a measuring element to a main body or movement of a slider to a column is measured, are known. For example, capacitance type displacement measuring instruments, in which a frame member holding a main scale is held in one hand and a detector including an index scale is held in the other hand, and a relative displacement value is read by an electrostatic method have been used.

Of these capacitance type displacement measuring instruments (in which a change is electric capacitance between the electrodes due to a relative displacement between two members movable relative to each other is detected on the basis of the change in phase of a detection signal and the relative displacement between two members is determind from the change in phase), there has been proposed one similar to the present invention, in which there are used two sine wave pattern electrodes having the forward end portions formed into complementary sine wave patterns, as disclosed in U.S. Pat. No. 3,068,457 for example. However, according to this U.S. Pat. No. 3,068,457, it is necessary that at least two sets of sine wave pattern electrodes be provided on two members movable relative to each other in the widthwise directions thereof. Thus, four sets of sine wave pattern electrodes must be provided in the embodiment thereof. This has been unsuitable for use in a compact sized displacement measuring instrument.

Furthermore, in Japanese Patent Laid-Open No. 94354/79 (corresponding to U.S. Pat. No. 4,420,754), there has been proposed one in which only one set of plates may be provided on two members movable relative to each other in the widthwise direction thereof. However, in this case, a polysphase oscillator of three phases or more is required, and further, when the digital process is conducted, the circuit arrangement becomes disadvantageously complicated.

SUMMARY OF THE INVENTION

The present invention has been developed to obviate the above-described disadvantages of the prior art and has as its object the provision of a capacitance type displacement measuring instrument wherein only one set of sine wave pattern electrodes is used, no polyphase oscillator is required, and the digital processing can be conducted by a simple circuitry arrangement, so that the measuring instrument can easily be rendered compact in size.

To this end, the present invention contemplates that, in a capacitance type displacement measuring instrument, wherein a change in electric capacitance between the electrodes due to a change in displacement between two members movable relative to each other is detected on the basis of a change in phase of a detection signal and a displacement between the two members is determined from the change in phase, the measuring instrument comprises:

square-wave generating means for generating square wave signals;

two transmitting electrodes provided on a first one of the members movable relative to each other in the moving direction thereof, to which the square wave signals from the squarewave generating means are applied in inverted phase;

two sets of wave pattern electrodes provided on the other (second) of the members movable relative to each other in the moving direction thereof, the base portions of which are opposed to the aforesaid two transmitting electrodes, respectively, and the forward end portions of which are formed into complementary continuous wave patterns;

receiving electrodes provided in plural number on the aforesaid first movable member in the moving direction thereof, and opposed to the forward end portions of the aforesaid two sets of wave pattern electrodes;

a multiplexer for successively taking in outputs from the receiving electrodes;

demodulating means for processing the amplitude-modulated square wave signals outputted from the multiplexer to thereby obtain demodulated signals corresponding to the amplitude modulation; and phase detecting means for detecting a change in phase of the demodulated signal outputted from the demodulating means.

According to the present invention, only one set of wave pattern electrodes need be provided; moreover, no polyphase oscillator is required, and the signal processing can be conducted by a simple circuitry arrangement, so that the measuring instrument can be rendered compact in size.

A specific form of the present invention is of such an arrangement that the frequency of the square wave signal generated by the square wave generating means is a high-frequency wave of 1–50 MHz, whereby the capacitive reactance is minimized.

Another specific form of the present invention is of such an arrangement that the wave pattern electrodes are separated and insulated from one another, whereby the measuring instrument is not easily subjected to the influence of external noises.

A further specific form of the present invention is of such an arrangement that the forward end portions of the wave patten electrodes are formed into complementary sine wave patterns, so that the amplitude-modulated signals can easily be demodulated.

A still further specific form of the present invention is of such an arrangement that the receiving electrodes include active receiving electrodes connected to the multiplexer and inactive receiving electrodes provided at opposite end portions in the moving direction thereof and not connect to the multiplexer, so that the boundary conditions at the end portions of the active electrodes are well controlled.

A still further specific form of the present invention is of such an arrangement that a plurality of sets of the active receiving electrodes are provided, so that the capacitance can be increased and the measuring accuracy can be improved.

A still further specific form of the present invention is of such an arrangement that one set of the acitve receiving electrodes includes 2-100 electrodes.

A still further specific form of the present invention is of such an arrangement that the length of a set of the active receiving electrodes is made to be equal to a pitch of the wave pattern or an integral multiple of it so that the best performance can be obtained.

A still further specific form of the present invention is of such an arrangement that a switching frequency of the multiplexer is made to be 10-100 KHz, so that a satisfactory response can be obtained even when the speed of relative displacement is high.

A still further specific form of the present invention is of such an arrangement that a change-over frequency signal of the multiplexer is formed by frequency-dividing the square wave signals generated by the square-wave generating means, so that the device can be further simplified.

A still further specific form of the present invention is of such an arrangement that the demodulating means includes a peak detector for detecting the amplitude-modulated square wave signals outputted from the multiplexer, and a high-pass filter for removing the direct current (DC) offset, so that demodulated signals can be obtained by a relatively simple electronic circuit.

A still further specific form of the present invention is of such an arrangement that the demodulating means includes a synchronous demodulator for extracting the amplitude-modulation component from the amplitude-modulated square wave signals outputted from the multiplexer, so that it can be easily fabricated in integrated circuit form.

A still further specific form of the present invention is of such an arrangement that the phase detecting means detects a phase difference between the demodulated signals outputted from the demodulating means and scan control signals of the multiplexer, so that a change in phase can be easily detected.

A still further specific form of the present invention is of such an arrangement that the phase detecting means can detect a change in phase through more than 360 degrees, so that a change in phase of one cycle or more can be accurately measured.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 5 is a plan view showing the essential portions of the arrangement of the electrodes on the slider in a second embodiment of the capacitance type linear displacement measuring instrument, to which the present invention is applied.

DETAILED DESCRIPTION OF THE INVENTION

Detailed description will hereunder be given of the capacitance type linear displacement measuring instrument, to which the present invention is applied, with reference to the drawings.

Figure 1:
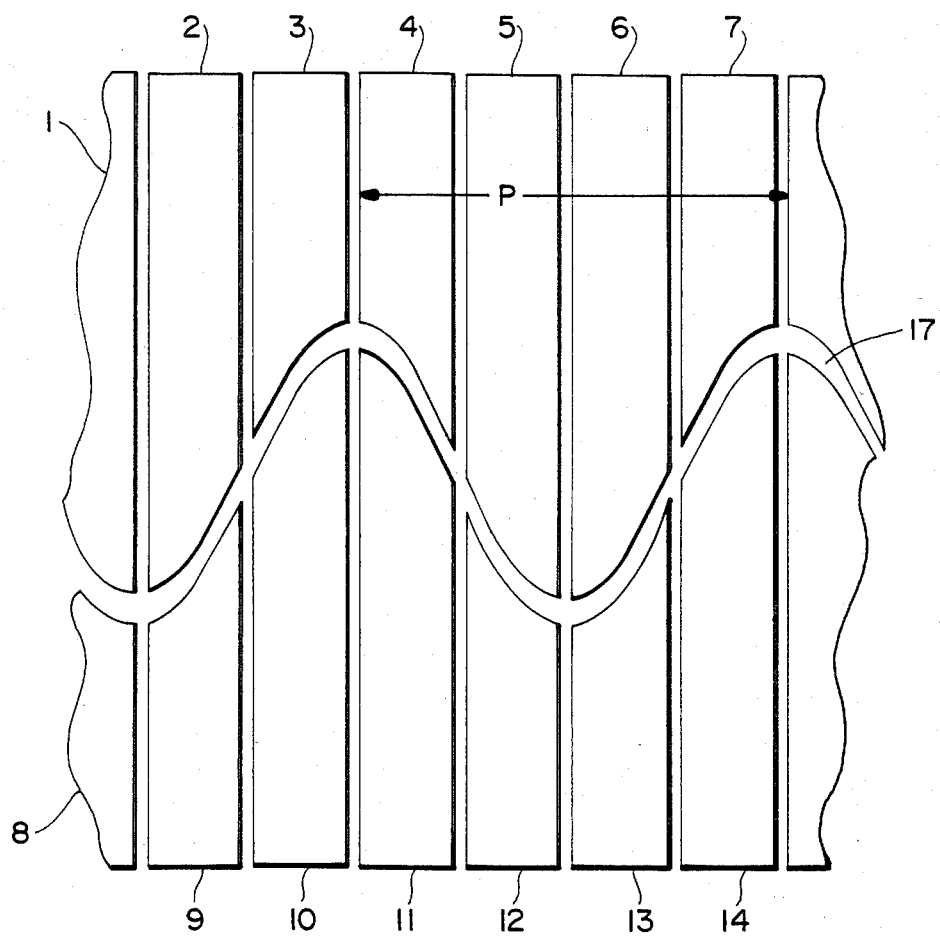
FIG. 1 is a plan view showing the arrangement of the electrodes on the scale in a first embodiment of the capacitance type linear displacement measuring instrument, to which the present invention is applied.
Figure 2:
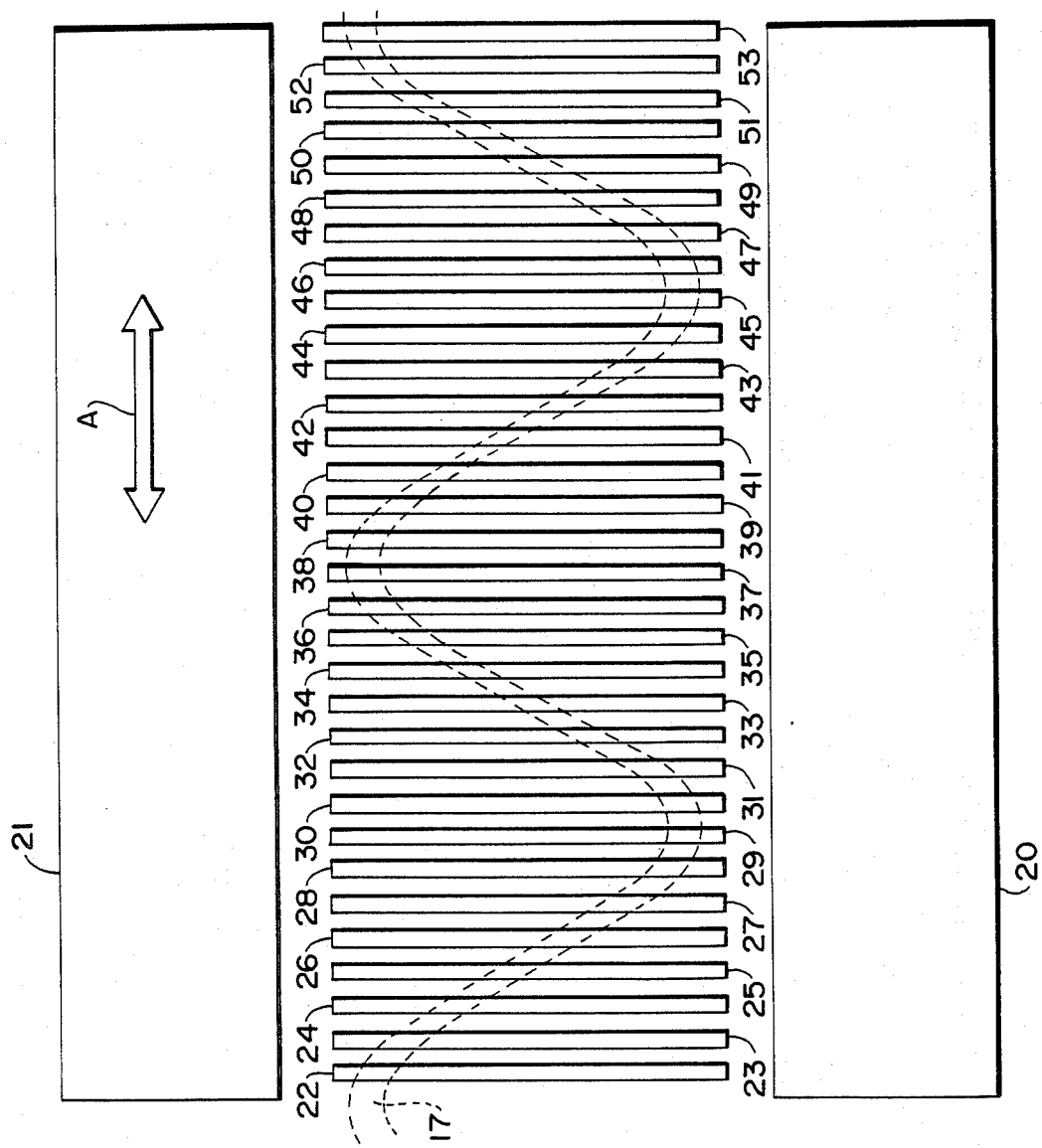
FIG. 2 is a plan view showing the arrangement of the electrodes on the slider in the first embodiment.

FIG. 1 shows a configuration of the electrodes on a scale or a stator in the first embodiment of the present invention, and FIG. 2 shows a configuration of the electrodes on the slider, which are movable relative to the scale in the longitudinal direction of the scale with the slider electrodes being spaced a predetermined distance from the scale. The electrodes partly shown in FIG. 1 have two rows of sine wave pattern electrodes 1-7 and 8-14, which are disposed in the moving direction of the slider, formed at the forward end portions thereof into complementary sine wave patterns of a pitch P, and separated and insulated from one another in the moving direction of the slider by an insulating portion 17. In FIG. 1, the upper row consits of the sine wave electrodes 1-7 and lower row consists of the sine wave electrodes 8-14. FIG. 1 shows only a short section of the stator, and the sine wave electrodes 1-7 and 8-14 are repeatedly provided over the total length of the stator.

As shown in FIG. 2, on the slider, there are provided two relatively large transmitting electrodes 20 and 21 opposed to the base portions of the two rows of sine wave electrodes 1-7 and 8-14, respectively, and relatively small receiving electrodes 22-53 provided in plural number (32 in number in this embodiment) in the moving direction of the slider and opposed to the forward end portions of the aforesaid two rows of sine wave electrodes 1-7 and 8-14. When the slider is disposed on the scale as in the normal manner in the measuring operation, the electrodes of the slider are opposed to and spaced a very small distance, e.g., about 0.1 mm apart from the electrodes of the scale. To show the relationship between the electrodes of the slider and the electrodes of the scale, the position of the insulating portion 17 is indicated by broken lines in FIG. 2. During the measuring operation, the slider is movable relative to the scale in a direction indicated by an arrow A.

As shown in FIG. 2, the receiving electrodes 22-53 include active receiving electrodes 30-45 in the central portion, connected to an electronic circuitry used for determining the position of the slider relative to the scale; and inactive receiving electrodes 22-29 and 46-53 provided at opposite end portions of the receiving electrodes in the moving direction of the slider, not connected to the external circuit, but being useful in controlling the boundary conditions. These inactive receiving electrodes 22-29 and 46-53 may be dispensed with, in which case, however, the measuring accuracy may be lowered slightly.

In this embodiment, sixteen (16) electrodes 30-45 are used as the active receiving electrodes. However, the number N of these active receiving electrodes need not be limited as long as N is at least two. However, in practice, the upper limit of the number $N_3$ is about 100. In FIG. 2, it should be noted that the length of the scale covered by the active receiving electrodes 30-45 is equal to the pitch P of the sine wave electrodes (refer to FIG. 1). The length need not necessarily be equal to the pitch P, however, when the length of the active receiving electrodes is equal to the pitch P or an integral multiple of P, the measuring instrument can display the best performance.

Figure 3:
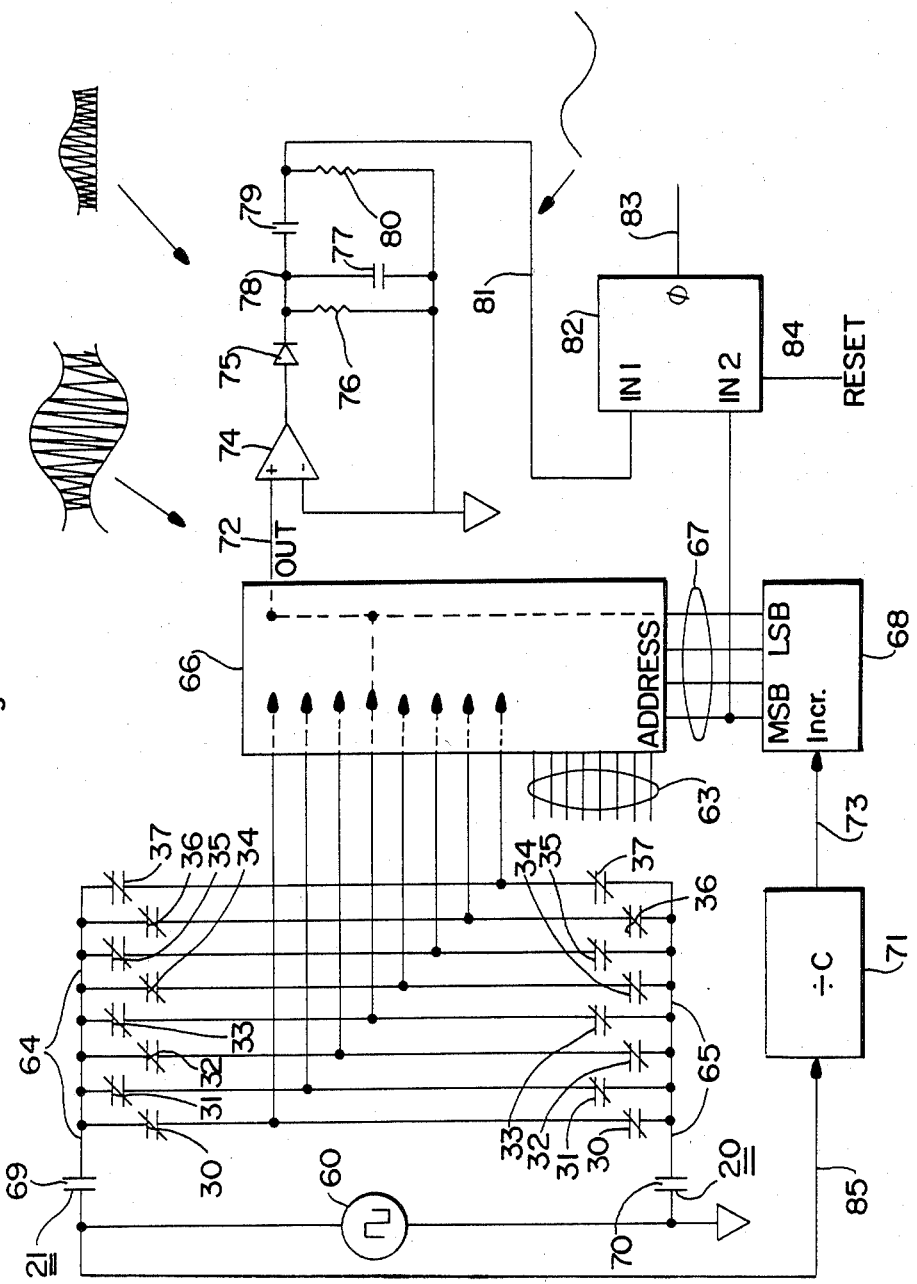
FIG. 3 is a block diagram showing the arrangement of the electronic circuitry in the first embodiment.

FIG. 3 shows electronic circuitry for determining the position of the slider and the connection between the slider to the electrodes. The transmitting electrodes 20 and 21 are connected to two output terminals of a square wave generator 60. For the sake of simplification, the transmitting electrode 20 is assumed to be ground of the circuit. In order to avoid an overly-complicated drawing, FIG. 3 represent a simplification of the actual circuitry in two ways. More specifically, as for the active receiving electrodes 30–45, only the first eight active receiving electrodes 30–37 are clearly shown in FIG. 3. Similarly to the first eight ones, the other eight active receiving electrodes 38–45 are connected through eight signal lines 63, respectively, as shown in FIG. 3. Furthermore, instead of showing the respective sine wave electrodes on the scale, in FIG. 3 all of the sine wave electrodes 1–7 in the upper row are treated as a single electrode indicated by reference numeral 64. Similarly, the sine wave electrodes 8–14 in the lower row on the scale are treated as a single electrode indicated by reference numeral 65. As is apparent from the analysis of the circuitry, all the scale electrodes in each row, which are beneath the slider, have potentials substantially equal to one another. Therefore, showing the electrodes of each row connected together as has been done in FIG. 3 is electrically equivalent to the actual measuring instrument which has the various electrodes of each row insulated from each other.

In consideration of the above-described simplification, as shown in FIG. 3, sixteen (16) active receiving electrodes 30–45 are connected to input terminals of a multiplexer 68 having sixteen (16) input channels. The action of the multiplexer 66 is indicated schematically by broken lines in FIG. 3. An address input of the multiplexer 66 consisting of signal lines 67 is connected to the count register of a 4-bit binary counter 68.

Consideration of the relative electrode areas shown in FIG. 2 will reveal that the capacitor formed by the transmitting electrode 21 and the upper row of the sine wave pattern electrodes 1–7 has a relatively large capacitance compared to the capacitance between any single receiving electrode and either row of scale electrodes. This capacitor formed by the transmitting electrode 21 and the upper row of the sine wave pattern electrodes 1–7 is indicated by reference numeral 69 in FIG. 3. Similarly, the capacitor formed by the transmitting electrode 20 and the lower row of the sine wave pattern electrodes 8–14 is denoted by reference numeral 70 in FIG. 3. This capacitor also has a relatively large capacitance. The capacitors formed by the active receiving electrodes and the scale electrodes are shown as variable capacitors in FIG. 3. In fact, the capacitance of each of these capacitors will vary as the slider is moved relative to the scale.

Bearing in mind that the capacitance of capacitors 69 and 70 is relatively large, one can see from the circuit of FIG. 3 that each active receiving electrode is the output electrode of a capacitive voltage divider, and the voltage on each of these electrodes will be a certain fraction of the voltage generated by the square-wave generator 60. When the slider is positioned as shown in FIG. 2, this fraction is rather small for electrodes 36, 37 and 38, and is rather large (i.e., nearly equal to 1.0) for electrodes 30, 31, 44 and 45. For electrodes 33 and 41, the fraction would be about 0.5.

The frequancy of the square-wave generator 60 is preferably rather high (e.g., 1–50 MHz) in order to minimize capacitive reactance. Referring to FIG. 3, a frequency divider 71 is used for generating a clock frequency suitable for the counter 68. This clock frequency determines the number of cycles of generator 60 per measuring operation, and, to conduct the measuring opertion with high accuracy, a rather low clock frequency is desirable. However, in order for th circuitry to accurately respond to the maximum expected slider velocity, the clock frequency must be sufficiently high. In consequence, a suitable clock frequency would probably be between 10–100 KHz. Therefore, a value of frequency dividing ratio C in the frequency divider 71, capable of providing a required clock frequency to the counter 68 should be selected.

Referring still to FIG. 3, the output of the multiplexer 66 on a signal line 72 is an amplitude-modulated square wave signal. The carrier frequency of this amplitudemodulated signal will be equal to the frequency of the squarewave generator 60. Furhtermore, the frequence of modulation will be equal to the counter clock frequency (on signal line 73) divided by 16. Referring to FIG. 2 in addition ot FIG. 3 will reveal that the phase of the modulation, relative to the phase of the most significant bit (MSB) output of the counter 68 will depend on the position of the slider relative to the scale. The circuit of FIG. 3 is designed to measure this phase difference $\phi$ and thereby measure the position of the slider relative to the scale.

An amplitude-modulated signal on the signal line 72 is amplified by an amplifier 74, and a resulting output signal from the amplifier 74 is detected by a peak detector composed of a diode 75, resistor 76, and a capacitor 77. The detected modulation signal is found on the signal line 78, but this signal has a DC offset. A highpass filter composed of a capacitor 79 and a resistor 80 removes the DC offset leaving a zero-centered modulation signal on the signal line 81. Numerous circuits for demodulation are known and could be used. For example, instead of the diode 75, resistors 76 and 80, and capacitors 77 and 79, which are used in FIG. 3, a synchronous demodulator might be used. One advantage of a synchronous demodulator is that it can be easily fabricated in integrated circuit form using the minimum number of large capacitors. The capacitors 77 and 79 used in FIG. 3 must have relatively large capacitance and would therefore be difficult to fabricate in integrated circuit form.

Referring again to FIG. 3, the demodulated signal on the signal line 81 is fed to one input terminal (IN 1) of a phase detector 82. An input signal to the other input terminal (IN 2) of the phase detector 82 is the MSB output from the counter 68. Thus, the output of the phase detector 82 on signal line 83 has a voltage proportional to the phase $\phi$ of the demodulated signal relative to the MSB signal of the counter 68 and therefore represents the position of the slider relative to the scale.

Instead of the phase detector 82 with analogue output as shown in FIG. 3, a phase detector with digital output could be used. It is necessary that the phase detector 82 be capable of phase measurement over a range of several times 360 degrees. This feature permits the measuring instrument to make accurate and unambiguous measurement of distance equal to several times the pitch P of the sine wave pattern. Phase detectors capable of measuring greater than 360 degrees typically have provision for being reset. In FIG. 3, the reset input to the phase detector 82 is shown as the signal line 84.

Figure 4:
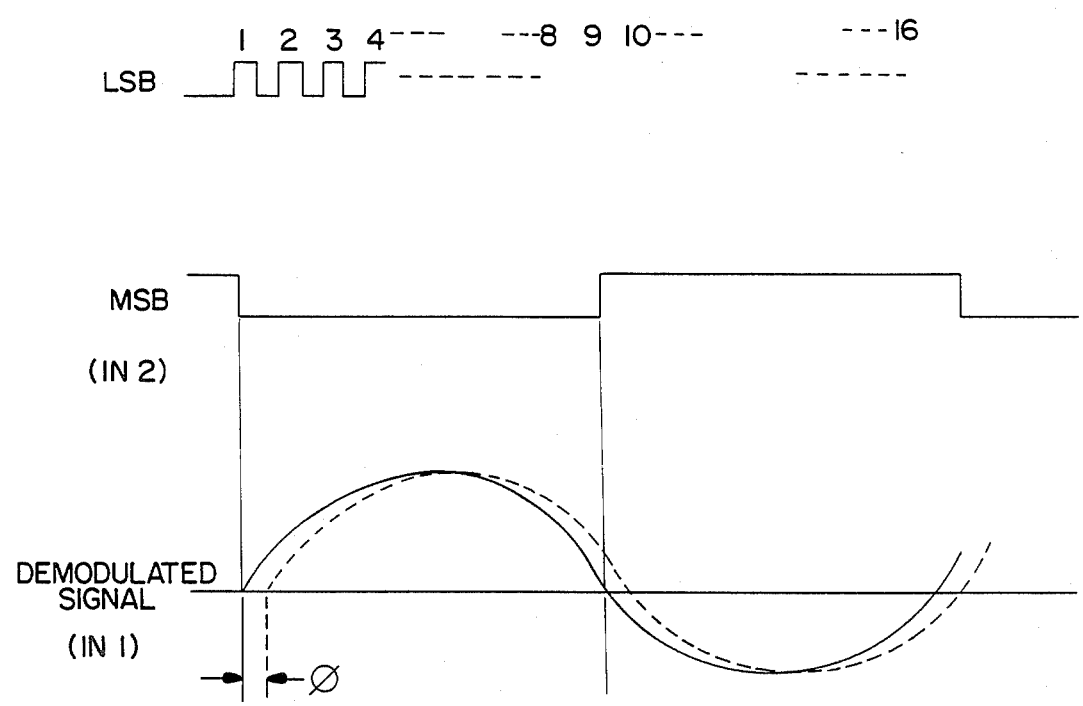
FIG. 4 is a chart showing examples of the waveforms of the signals in the respective portions of the electric circuitry in the first embodiment.

FIG. 4 shows examples of the wave forms of the signals in the respective portions of the first embodiment.

It is desirable to make the capacitance between the active receiving electrodes 30–45 and the scale electrodes as large as practically possible in order to maximize the signal-to-noise (S/N) ratio of the received signal. It is also desirable to minimze the pitch P of the sine wave pattern electrodes until photolithography limitations are reached in order to obtain high resolving power. Unfortunately, descreasing the pitch P will also decrease the active electrode capacitances, which would desirably be maximized. This dilemma can be avoided by using the scheme of the second embodiment shown in FIG. 5.

An improved arrangement for the receiving electrodes is shown in FIG. 5. Each active receiving electrode is connected to a number (three in this second embodiment) of similar receiving electrodes, each located a distance P from each other. For example, the additional electrodes connected to the active receiving electrode 30 are denoted by 30', 30'' and 30''' in FIG. 5. Additional electrodes connected to the active receiving electrode 31 are denoted by 31', 31'' and 31''' in FIG. 5, and so on. In order to avoid a cluttered drawing, three dots (. . .) are used in FIG. 5 to denote the continuation of a repetitive pattern of the active receiving electrodes or of conductors.

It should be apparent that the technique of FIG. 5 could be extended to any number of active receiving electrodes in each set. For example, six active receiving electrodes per set would result in the active receiving electrode 30 being connected to the active receiving electrodes 30', 30'', 30''', 30'''', and 30'''''.

Another advantage of this second embodiment is that the capacitance of several cycles is added together, whereby certain errors in dimensions of the active receiving electrodes and the like are absorbed, so that measuring accuracy can be improved.

A further advantage of this second embodiment concerns the inactive receiving electrodes 22–29 and 46–53 (refer to FIG. 2). Note that in FIG. 2, these inactive electrodes take up a relatively large fraction (about 25%) of the total surface area of all the slider electrodes. On the other hand, the FIG. 5 arrangement can reduce this fraction to a negligible value (about 8% in FIG. 5). Reducing the area of the inactive electrodes is desirable so that the total size of the slider assembly can be minimized. Minimizing the slider area is especially important if this measuring instrument is to be used as a handheld caliper.

Due to the scale of the FIG. 5 drawing, it was not possible to show the inactive electrodes 47–53 in FIG. 5.

Figure 1A:
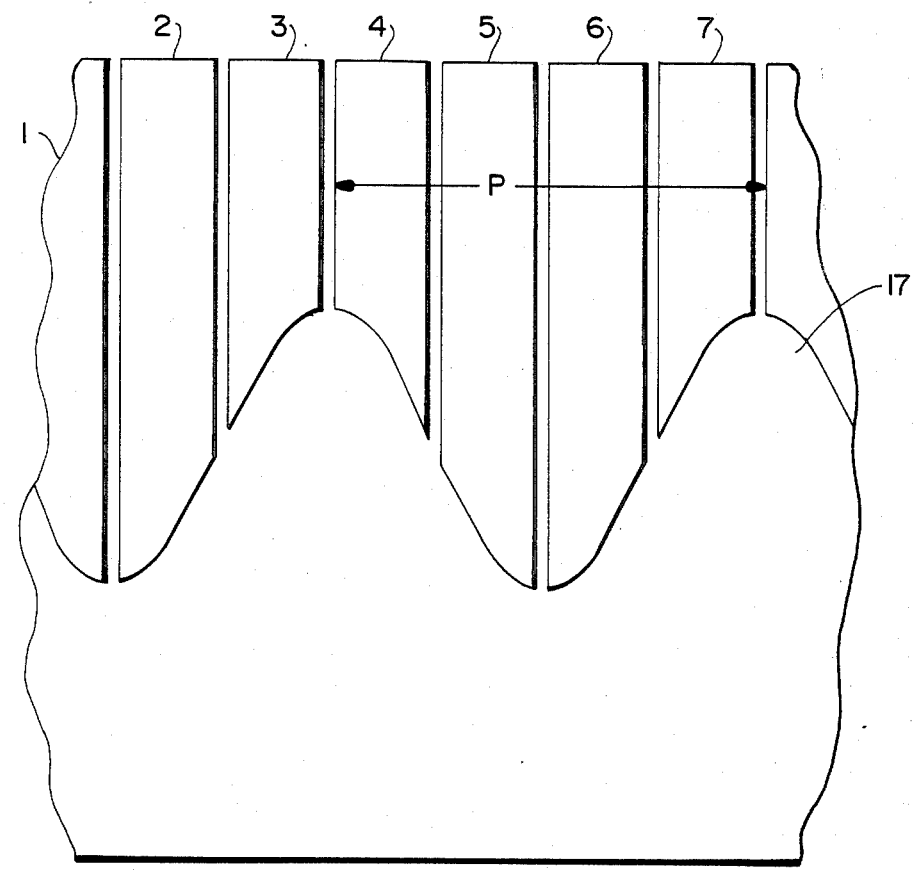
FIGS. 1A and 1B are plan views showing alternative embodiments of the capacitance type linear displacement measuring instrument.
Figure 1B:
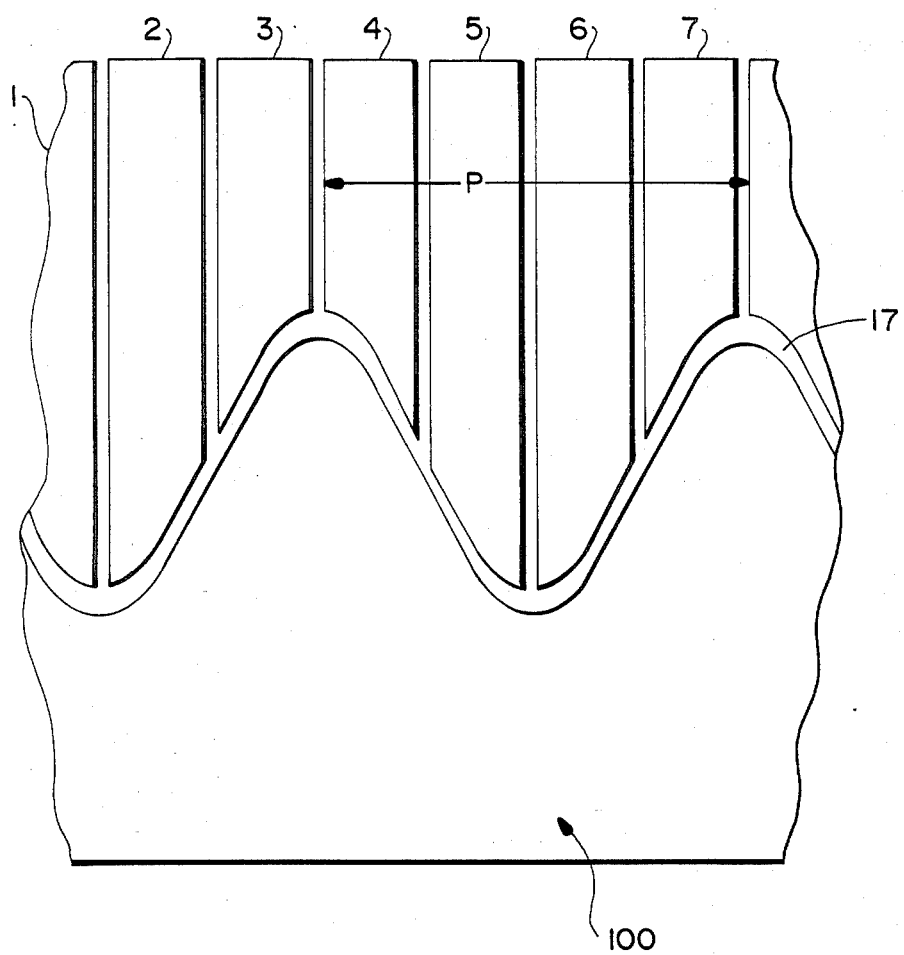

In the embodiment described above with reference to FIGS. 1 and 2, the scale or stator is provided with an upper row of sine wave pattern electrodes 1–7 and a lower row of sine wave pattern electrodes 8–14. However, it is noted that one row of sine wave pattern electrodes can be eliminated, as illustrated in FIG. 1A. Further, it is noted that a single ground-plane electrode 100 can be substituted for one row of a plurality of sine wave patten electrodes, as illustrated in FIG. 1B.

In all the embodiments described above, the wave patten of the scale electrodes has been a sine wave. However, the wave form of the wave pattern need not necessarily be limited to the sine wave pattern, and other wave forms such as triangular or trapezoidal waveforms may be used.

In all the embodiments described above, the present invention has been applied to the linear displacement measuring instrument. However, the scope of application of the present invention need not necessarily be limited to this, and it is clear that the present invention is applicable to a rotary displacement measuring instrument such as a rotary encoder.

What is claimed is:

1. A capacitance type displacement measuring instrument, wherein a change in electric capacitance between electrodes due to relative displacement between two members movable relative to each other is detected on the basis of a change in phase of a detection signal, and a relative displacement between the two members is measured from said change in phase, said measuring instrument comprising:
   square-wave generating means for generating square wave signals;
   two transmitting electrodes provided on one of said members movable relative to each other in the moving direction thereof, to which said square wave signals from the square wave generating means are applied in inverted phase;
   two wave pattern electrodes provided on the other of said members movable relative to each other in the moving direction thereof, the base portions of which are opposed to said two transmitting electrodes, respectively, and the forward end portions of which are formed into complementary wave patterns, said two wave pattern electrodes having a specified pitch, each wave pattern electrode including a set of subelectrodes, separated and insulted from one another in the moving direction;
   receiving electrodes provided in plural number on said one of said members in the moving direction thereof, and opposed to the forward end portions of said two wave pattern electrodes, said receiving electrodes having a pitch smaller than said specified pitch of said wave patten electrodes;
   a multiplexer for successively taking in signals directly from each of said receiving electrodes;
   demodulating means for processing amplitude-modulated square wave signals outputted from said multiplexer into a waveform corresponding to the wave pattern on said wave pattern electrodes; and
   phase detecting means for detecting the phase of the demodulated signal outputted from the demodulating means.

2. A capacitance type displacement measuring instrument as set forth in claim 1, wherein the frequency of said square wave signal generated by said square-wave generating means is made to be a high-frequency wave of 1–50 MHz.

3. A capacitance type displacement measuring instrument as set forth in claim 1, wherein the forward end portions of said wave pattern electrodes are formed into complementary sine wave patterns.

4. A capacitance type displacement measuring instrument as set forth in claim 1, wherein said receiving electrodes include active receiving electrodes connected to said multiplexer and inactive receiving electrodes provided at opposite end portions in the moving direction thereof and not connected to said multiplexer.

5. A capacitance type displacement measuring instrument as set forth in claim 4, wherein a plurality of sets of said active receiving electrodes are provided.

6. A capacitance type displacement measuring instrument as set forth in claim 4, wherein one set of said active receiving electrodes includes 2-100 electrodes.

7. A capacitance type displacement measuring instrument as set forth in claim 4, wherein the length of a set of said active receiving electrodes is made to be equal to the specified pitch of the wave pattern electrodes or an integral multiple thereof.

8. A capacitance type displacement measuring instrument as set forth in claim 1, wherein a switching frequency of said multiplexer is made to be 10-100 KHz.

9. A capacitance type displacement measuring instrument as set forth in claim 1, wherein a switching signal of said multiplexer is formed by frequency-dividing said square wave signals generated by said square-wave generating means.

10. A capacitance type displacement measuring instrument as set forth in claim 1, wherein said demodulating means includes a peak detector for detecting said amplitude-modulated square wave signals outputted from said multiplexer, and a high-pass filter for removing the direct current offset component.

11. A capacitance type displacement measuring instrument as set forth in claim 1, wherein said demodulating means includes a synchronous demodulator for extracting an amplitude-modulation component from said amplitude-modulated square wave signals outputted from said multiplexer.

12. A capacitance type displacement measuring instrument as set forth in claim 1, wherein said phase detecting means detects a phase difference between said demodulated signals outputted from said demodulating means and scan control signals of said multiplexer.

13. A capacitance type displacement measuring instrument as set forth in claim 1, wherein said phase detecting means can detect a change in phase through 360 degrees or more.

14. A capacitance type displacement measuring instrument, wherein a change in electric capacitance between electrodes due to a relative displacement between two members movable relative to each other is detected on the basis of a change in phase of a detection signal, and a relative displacement between the two members is measured from said change in phase, said measuring instrument comprising:

square-wave generating means for generating square wave signals;

two transmitting electrodes provided on one of said members movable relative to each other in the moving direction thereof, to which said square wave signals from the square wave generating means are applied in inverted phase;

at least one wave pattern electrode provided on the other of said members movable relative to each other in the moving direction thereof, the base portions of which are opposed to said two transmitting electrodes, respectively, and the forward end portions of which are formed into complementary wave patterns, said wave pattern having a specified pitch, and said at least one wave pattern electrode including a set of subelectrodes, separated and insulated from one another in the moving directions;

receiving electrodes provided in plural number on said one of said members in the moving direction thereof, and opposed to the forward end portions of said at least one wave pattern electrode, said receiving electrode having a pitch smaller than said specified pitch of said wave pattern;

a multiplexer for successively taking in signals directly from each of said receiving electrodes;

demodulating means for porcessing amplitude-modulated square wave signals outputted from said multiplexer into a waveform corresponding to the wave pattern on said at least one wave pattern electrode; and phase detecting means for detecting the phase of the demodulated signal outputted from the demodulating means.

* * * * *